(12) United States Patent
Viedt (10) Patent No.: US 9,883,763 B1
(45) Date of Patent: Feb. 6, 2018

(54) HEATING CURTAIN ROD WITH INTEGRATED SPEAKERS

(71) Applicant: Cash J. Viedt, Las Vegas, NV (US)

(72) Inventor: Cash J. Viedt, Las Vegas, NV (US)

( * ) Notice: Subject to any disclaimer, the term of this patent is extended or adjusted under 35 U.S.C. 154(b) by 0 days.

(21) Appl. No.: 15/224,947

(22) Filed: Aug. 1, 2016

(51) Int. Cl.
| | |
|---|---|
| *F26B 21/06* | (2006.01) |
| *A47H 1/02* | (2006.01) |
| *A47K 10/48* | (2006.01) |
| *A47K 3/38* | (2006.01) |
| *F26B 23/04* | (2006.01) |
| *F26B 21/00* | (2006.01) |
| *G01K 1/14* | (2006.01) |
| *H04R 1/02* | (2006.01) |

(52) U.S. Cl.
CPC ............... *A47H 1/02* (2013.01); *A47K 3/38* (2013.01); *A47K 10/48* (2013.01); *F26B 21/004* (2013.01); *F26B 21/06* (2013.01); *F26B 23/04* (2013.01); *G01K 1/14* (2013.01); *H04R 1/028* (2013.01); *A47H 2001/0215* (2013.01); *H04R 2420/07* (2013.01)

(58) Field of Classification Search
CPC ........ F26B 21/06; F26B 21/004; F26B 23/04; A45D 20/12; A45D 20/00; A47K 1/02; A47K 3/38; A47K 10/48; G01K 1/14; H04R 1/028; H04R 2420/07
USPC ..................................................... 34/90, 97
See application file for complete search history.

(56) References Cited

U.S. PATENT DOCUMENTS

| | | | | | |
|---|---|---|---|---|---|
| 5,404,419 | A | * | 4/1995 | Artis, Jr. ................ | A47K 10/48 34/239 |
| 5,857,262 | A | * | 1/1999 | Bonnema ............... | A45D 20/06 126/409 |
| 6,327,994 | B1 | * | 12/2001 | Labrador ............... | B01D 61/10 114/382 |
| 6,449,870 | B1 | * | 9/2002 | Perez ..................... | A45D 20/12 34/96 |
| 6,928,235 | B2 | * | 8/2005 | Pollack .................. | A47K 10/48 34/90 |
| 7,380,347 | B2 | * | 6/2008 | Coats ..................... | A45D 20/12 34/97 |
| 8,458,922 | B2 | * | 6/2013 | Parisi ..................... | A45D 27/48 108/115 |

(Continued)

FOREIGN PATENT DOCUMENTS

KR    20050014113 A  *  2/2005
WO    WO 2004054199 A1  *  6/2004  ............. A45D 20/06

*Primary Examiner* — Stephen M Gravini (57) ABSTRACT

A shower curtain and window curtain hanging structure provides constant stream of heated air as well as the ability to sound audio from an external source. The hanging structure includes a tubular body, an at least one heating fan assembly, an at least one rechargeable battery, an at least one waterproof speaker, and a wireless communication device. The tubular body supports various types of curtains. The rechargeable battery, the heating fan assembly, and the wireless communication device are all internally mounted within the tubular body. The waterproof speaker is integrated into an external surface of the tubular body in order to sound audio towards a user. The heating fan assembly includes an impeller, a heating element, and an electric motor. The impeller is powered by the electric motor in order to forces air to pass by the heating element and expelling heated air onto the user.

13 Claims, 6 Drawing Sheets

(56) References Cited

U.S. PATENT DOCUMENTS

| | | | | |
|---|---|---|---|---|
| 8,763,750 B1* | 7/2014 | Berkman | ............... | H04R 1/021 |
| | | | | 181/150 |
| 9,326,578 B2* | 5/2016 | Yoshidome | ............ | A45D 20/12 |
| 9,474,347 B2* | 10/2016 | Pedroarena | ............ | A45D 20/12 |
| 2002/0157276 A1* | 10/2002 | Mujica | ................... | A45D 20/10 |
| | | | | 34/97 |
| 2006/0098961 A1* | 5/2006 | Seutter | ................... | A47K 10/48 |
| | | | | 392/383 |
| 2008/0225510 A1* | 9/2008 | Rocha | ................ | F21V 33/0056 |
| | | | | 362/86 |

* cited by examiner

HEATING CURTAIN ROD WITH INTEGRATED SPEAKERS

FIELD OF THE INVENTION

The present invention relates generally to hanging structures for shower curtains and window curtains. More specifically, the present invention is a hanging structure for shower curtains and/or window curtains which includes an integrated heating fan and a plurality of speakers to increase the comfort of a bather or a user within the structure's vicinity.

BACKGROUND OF THE INVENTION

The present invention is a curtain hanging structure with integrated beneficial features, a multitude of heater fans and a multitude of waterproof speakers. One particular use of the present invention is a shower curtain holder. The present invention is used to hold a shower curtain in a traditional method, through a multitude of hooks. Unlike traditional shower curtain hangers, the present invention provides a bather with the ability to play music in the bathroom without fear of electrocution and/or the possibility of damaging the music source. Currently, there are waterproof musical devices that is available to the public, but such devices are freestanding and require the user to dedicate space within the bathroom specifically for the device that is outside the shower. This, most often times, compromises the quality of the sound produced due to sound dampening caused by shower curtains and the noise produced by water flow. The present invention overcomes these problems through the integration of waterproof speakers directly into the shower curtain holder and allows the bather to wirelessly stream music through said waterproof speakers.

Another feature of the present invention that benefits the bather/user is the multitude of integrated heating fans. The heating fans blow heated air directly onto the bather after he or she steps out of the shower and is drying off. The heating fans helps the bather dry faster and increases his or her comfort level as stepping out of a hot shower is associated with a decrease in temperature felt by the body. Additionally, the present invention includes an external thermometer in order activate the heating fans anytime the temperature within the bathroom drop below a preset limit, determined by the bather. The multitude of heater fans and the multitude of waterproof speakers are powered by an at least one rechargeable battery.

The present invention may also be utilized outside the bathroom, in particular to hold window curtains. If used to hold window curtains, the user may integrate the multitude of waterproof speakers into his or her surround sound system. Additionally, the heating fans are ideal in addressing drafty windows or windows on a door. The heating fans may be configured to turn on when the temperature drops below a predefined setting, thus heating the interior space and saving the user in heating costs. In order to further save the user on heating and powering costs, the structure may contain a multitude of solar panel cells that are oriented towards the outdoors in order to recharge the internal battery.

DETAIL DESCRIPTIONS OF THE INVENTION

All illustrations of the drawings are for the purpose of describing selected versions of the present invention and are not intended to limit the scope of the present invention.

The present invention is a supporting structure for window curtains and shower curtains which includes an at least one heating fan assembly 5 and an at least one waterproof speaker 14. The heating fan assembly 5 is used to blow/circulate warm air around the supporting structure. When the present invention is used to support a window curtain for a window/door, the warm air heats the proximal interior space and is used to address drafty windows to increase the comfort of individuals near the window/door and within the building. When the present invention is used to support a shower curtain in a bathroom, the warm air increases the temperature within the bathroom before, during, and after the shower. Additionally, the heating fan assembly 5 blows warm air directly onto a bather after he or she steps out of the shower and is drying off. The at least one speaker provides a means for streaming/sounding audio directly with the present invention from an external source, such as the user's personal computing device or surround system.

Figure 1:
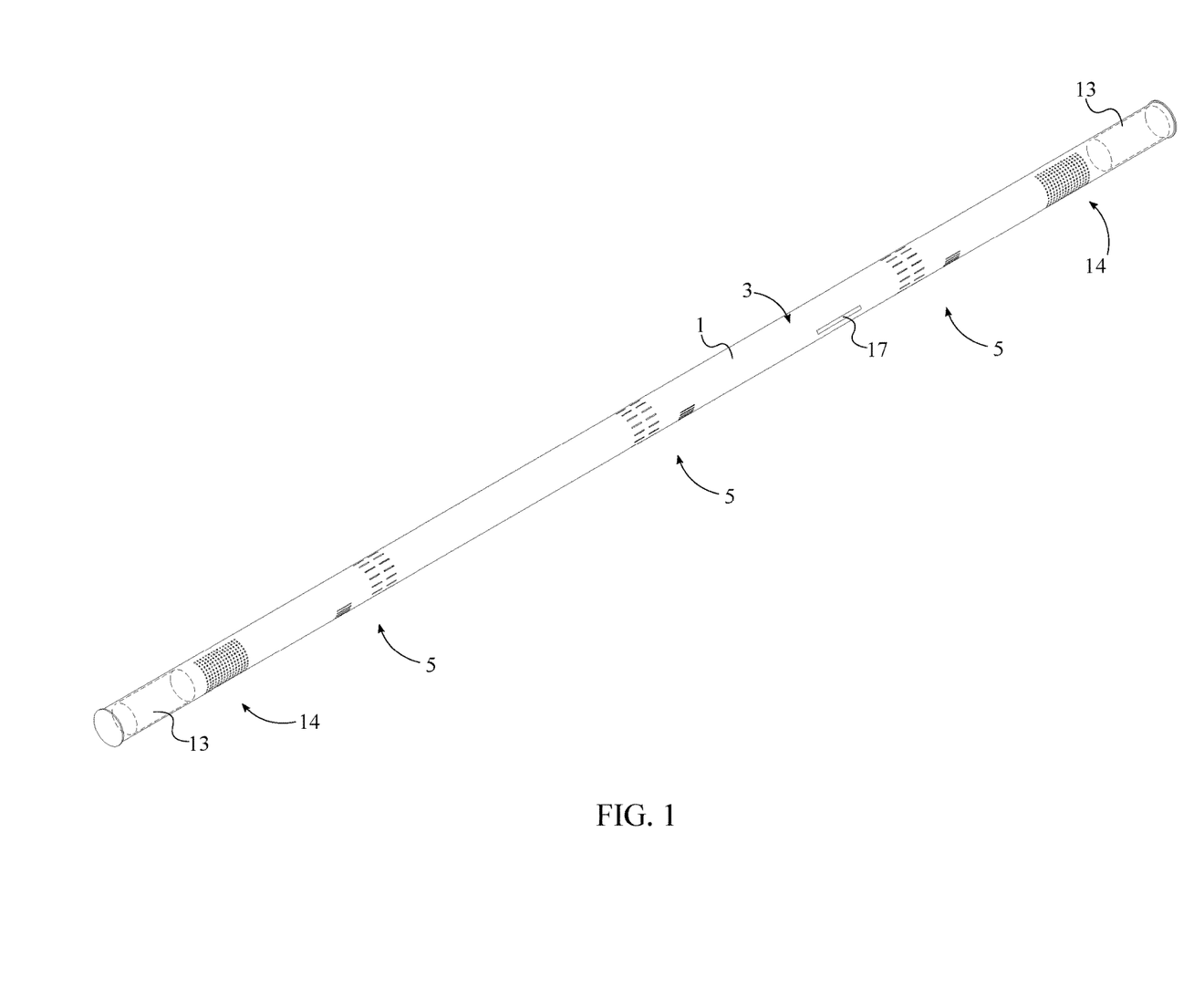
FIG. 1 is a perspective view of the present invention.

Referring to FIG. 1, the present invention comprises a tubular body 1, the at least one heating fan assembly 5, a wireless communication device 15, the at least one waterproof speaker 14, a microcontroller 16, and an at least one rechargeable battery 13. The tubular body 1 houses the constituents of the present invention and acts as the hanging structure for curtains such as shower curtains and window curtains, similar to traditional curtain rods. The shape, design, and sizing of the tubular structure may be implemented similar to traditional curtain rods. A cross section of the tubular body 1 is preferably circular and is sized to compliment current curtain hooks available on the market. The length of the tubular body 1 is subject to change in order to fit different bathroom and window sizes. The tubular body 1 may extent along a straight line or may be curved along a semi-circular path. In order to extend the product life-cycle of the present invention, the tubular body 1 is composed of anti-corrosion material such as stainless steel. The anti-corrosion material is especially necessary if the present invention is used in the bathroom environment as the present invention would be exposed to water for a prolonged amount of time; alternative material compositions may also be utilized. In one embodiment of the present invention, the tubular body 1 comprises a multitude of segments that are fitted within each other in order to allow for relative movement between the segments. This allows the user to easy adjust the length of the tubular body 1 to his or her personal needs and preferences. The telescopic feature may be implemented through a variety of means and is not meant to limit the scope of the present invention.

Figure 4:
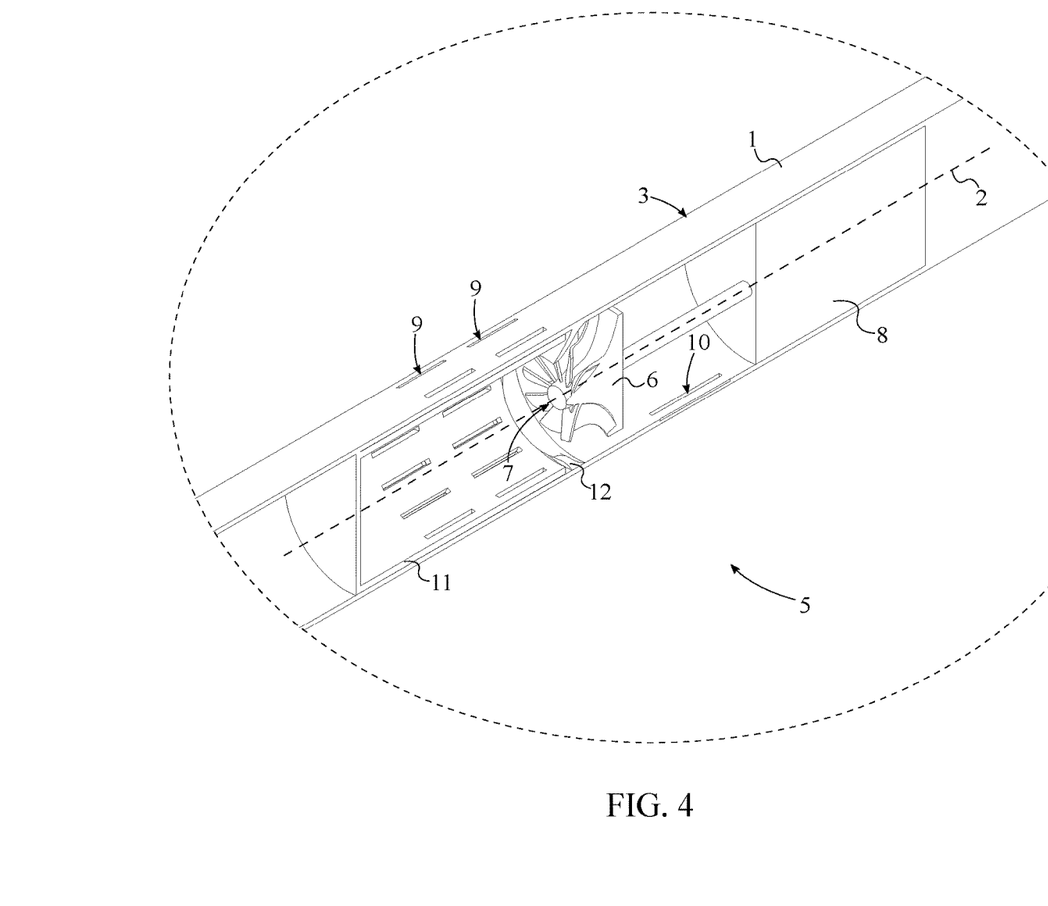
FIG. 4 is a perspective detailed view of the present invention taken about the circle B in FIG. 3.

The heating fan assembly 5 produces heated air and heats the surrounding area around the present invention. The heating fan assembly 5 is internally mounted within the tubular body 1 and comprises an impeller 6, an electric motor 8, a plurality of inlet slots 9, a plurality of outlet slots 10, and a heating element 11. The impeller 6 creates air flow through the heating fan assembly 5. The impeller 6 is oriented along a main axis 2 of the tubular body 1 as seen in FIG. 4 in order to create an air flow along the main axis 2 of the tubular body 1. The electric motor 8 converts electric energy into rotational energy in order to rotate the impeller 6 at a specific speed, thus forcing air to flow through the heating fan assembly 5. More specifically, the electric motor 8 is axially connected to the impeller 6, opposite an inlet side 7 of the impeller 6. The inlet side 7 of the impeller 6 denotes the side of the impeller 6 that sucks air into the impeller 6, in some impeller 6 designs the inlet side 7 is known as an eye inlet.

The plurality of inlet slots 9 act as the intake side of the heating fan assembly 5 and is radially traversing through the tubular body 1, adjacent to the inlet side 7 of the impeller 6. The plurality of outlet slots 10 act as the discharge side of the heating fan assembly 5, and is radially traversing through the tubular body 1. Referring to FIG. 4, the plurality of inlet slots 9 and the plurality of outlet slots 10 are positioned opposite to each other, across the impeller 6. As a result, the plurality of inlet slots 9 is in fluid communication with the plurality of outlet slots 10 through the impeller 6. The heating element 11 converts electric energy into heat and is positioned adjacent to the impeller 6. A variety of technologies may be used for the heating element 11 including, but not limited to, resistance wire, etched foil, ceramic-based heating elements, and silicone rubber heating elements. In the preferred embodiment of the present invention, the heating element 11 is a silicone-rubber heater sleeve. The silicone-rubber heater sleeve is positioned adjacent to the plurality of inlet slots 9 and is internally connected to the tubular body 1 as seen in FIG. 4. The silicone-rubber heater is relatively light and thin, ideal for small spaces such as inside the tubular body 1. Additionally, the silicone-rubber heater provides a uniform and rapid heating pattern, ideal for heating a flow of air through the heating fan assembly 5.

When activated, the heating fan assembly 5 first pulls air into the internal space of the tubular body 1 through the plurality of inlet slots 9. Next, the air is pumped past the heating element 11, thus raising the temperature of the air. Finally, the heated air is pumped out of the tubular body 1 by the impeller 6 through the plurality of outlet slots 10 into the area around the tubular body 1.

Referring to FIG. 4, in the preferred embodiment of the present invention, the heating fan assembly 5 further comprises an annular air diffuser 12 in order to efficiently redirect the air flow from the inlet of the impeller 6, through a multitude of vanes of the impeller 6, and out of the plurality of outlet slots 10. The annular air diffuser 12 is internally mounted within the tubular body 1 and is concentrically positioned around the impeller 6. The annular air diffuser 12 includes a plurality of complimentary vanes that are oriented to receive air flow from the impeller 6 and redirect said air flow past the impeller 6 and towards the plurality of outlet slots 10.

The wireless communication device 15 is internally mounted within the tubular body 1 and allows various external computing devices to connect, control, and interact with the present invention. In particular, the wireless communication allows the user to stream audio to the present invention in order to be sounded by the waterproof speaker 14. Type of technologies that may be used for the wireless communication device 15 include, but are not limited to, Bluetooth technologies and Wi-Fi technologies. The wireless communication device 15 allows the present invention to connect to devices such as smartphones, tablets, and other similar devices with wireless communication capabilities. In one embodiment, the wireless communication device 15 allows external devices to turn and off the heating fan assembly 5 as well as the wireless speaker. The waterproof speaker 14 sounds audio from an external source through the wireless communication device 15. The waterproof speaker 14 is integrated into an external surface 3 of the tubular body 1, oriented outwards. The sizing, wattage, and other characteristics of the waterproof speaker 14 are subject to change in order to accommodate user preferences and different applications.

Figure 5:
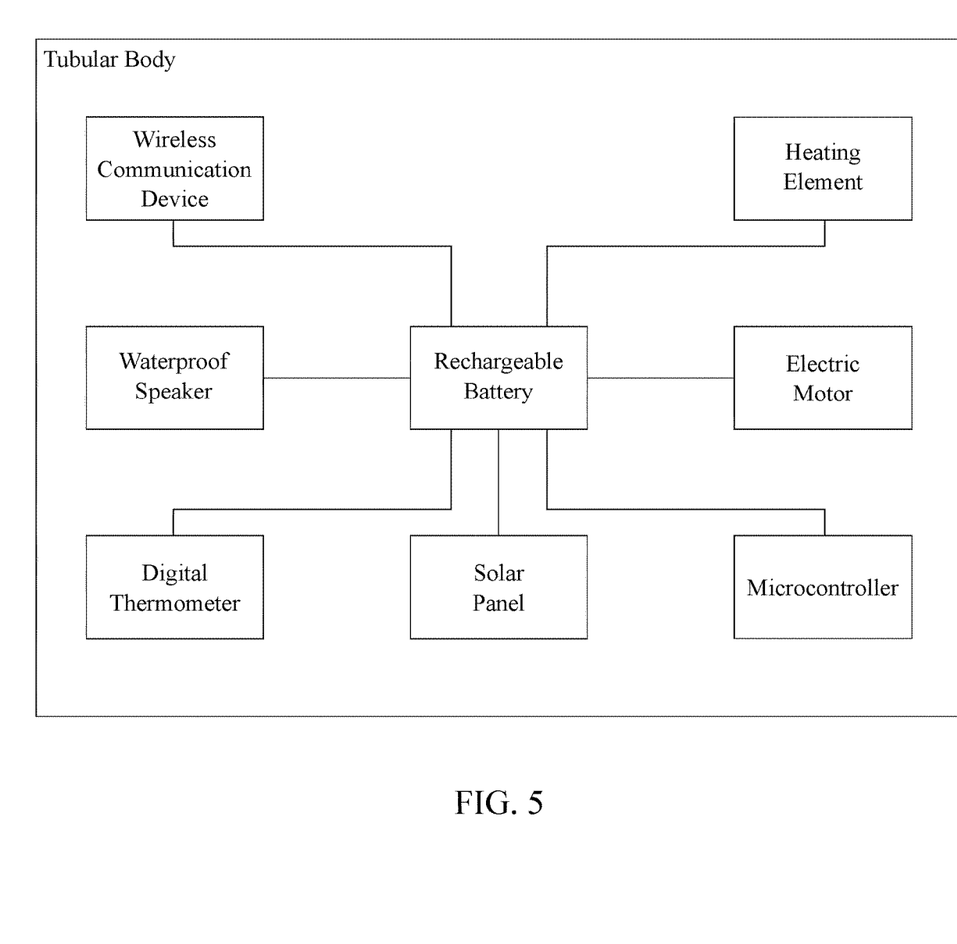
FIG. 5 is an electric schematic of the present invention.
Figure 6:
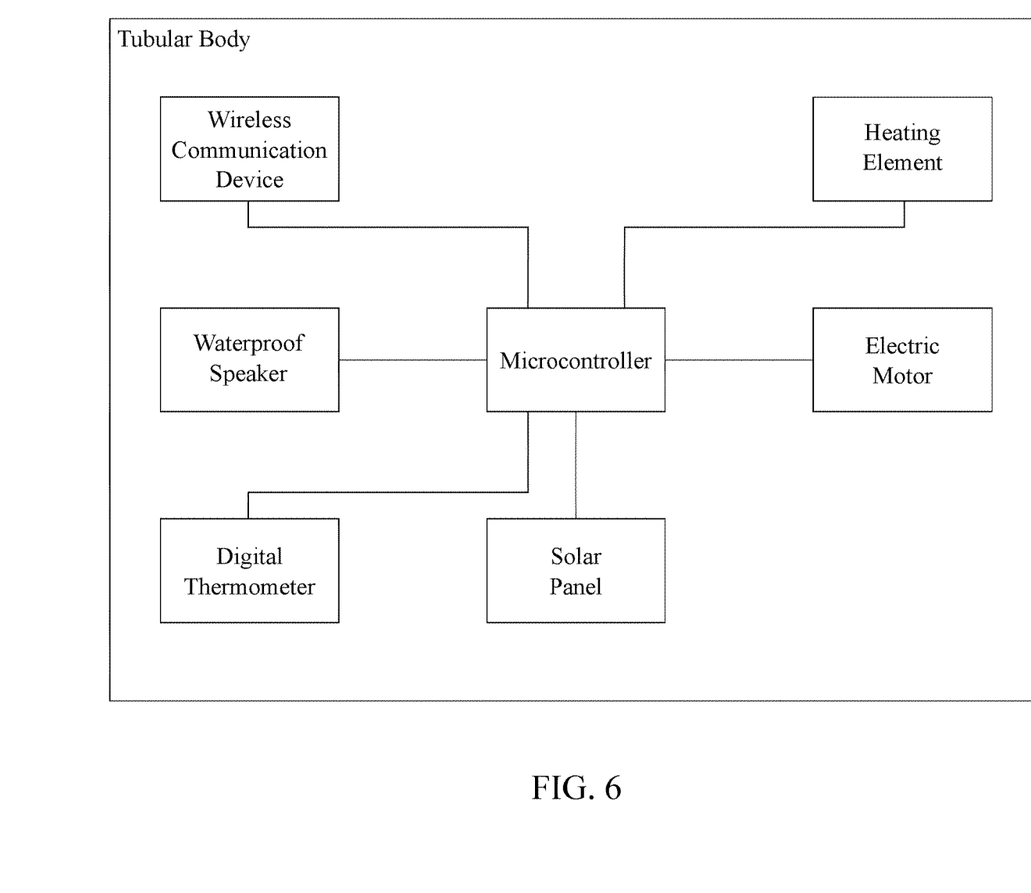
FIG. 6 is an electronic schematic of the present invention.

Referring to FIG. 6, the microcontroller 16 controls the electronic components of the present invention based on preset programming and user input; type of user input includes physical buttons and command signals received through the wireless communication device 15. The microcontroller 16 is internally mounted within the tubular body 1 and is electronically connected to the wireless communication device 15, the waterproof speaker 14, the electric motor 8, and the heating element 11. The rechargeable battery 13 provides the electric energy required for the operations of the present invention and is internally mounted within the tubular body 1. Referring to FIG. 5, the rechargeable battery 13 is electrically connected to the electric motor 8, the heating element 11, the waterproof speaker 14, the wireless communication device 15, and the microcontroller 16. A variety of battery types may be used for the rechargeable battery 13 component such as nickel cadmium batteries, lead acid batteries, lithium ion batteries, and lithium polymer batteries to name a few non-limiting examples. Additionally, the size, capacity, and other characteristics of the rechargeable battery 13 may vary to accommodate the power consumption requirements of the electronic constituents of the present invention.

It is preferred that the rechargeable battery 13 is removably mounted within the tubular body 1 in order to allow the user to easy access the rechargeable battery 13 for recharging. Additionally, the rechargeable battery 13 is terminally positioned along the tubular body 1. This feature may be implemented in a variety of ways. One way includes mounting the rechargeable battery 13 at an end of the tubular body 1, adjacent to a removable end-cap. The removable end-cap acts as a cover to retain the rechargeable battery 13 within the tubular body 1. In order to remove the rechargeable battery 13, all the user needs to do is disengage the removable end-cap from the rest of the tubular body 1 and pull out the rechargeable battery 13.

In one embodiment, the present invention further comprises a digital thermometer 17. The digital thermometer 17 records a current temperature directly around the tubular body 1. Referring to FIG. 1, the digital thermometer 17 is externally mounted to the tubular body 1, preferably flush with an external surface 3 of the tubular body 1. Additionally, the digital thermometer 17 is electrically connected to the rechargeable battery 13 and electronically connected to the microcontroller 16. The temperature information gathered by the digital thermometer 17 may be used to operate the present invention automatically, based on pre-set rules. In particular, the temperature information would allow for the user to set a temperature threshold for the present invention which dictates under which conditions the heating fan assembly 5 is to be turned on. For example, once set, the heating fan assembly 5 may be configured to turn on anytime the temperature directly around the tubular body 1 drops lower or higher than the temperature threshold. Another possible implementation may include an operating temperature range wherein the heating fan assembly 5 is turned on within the range, lower than the range, or higher than the range.

Figure 2:
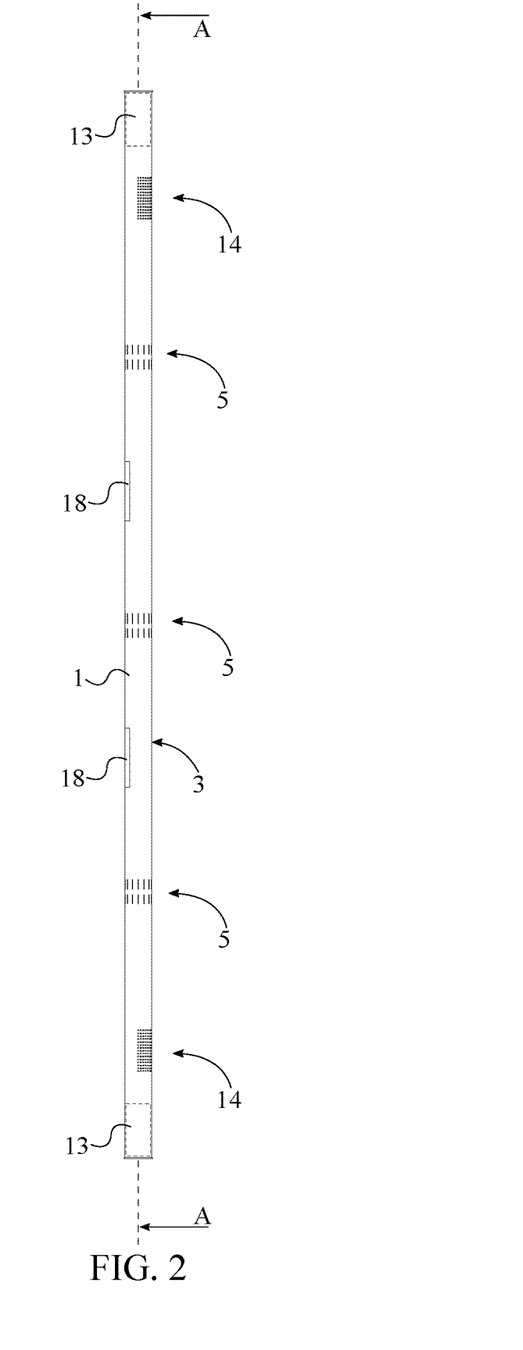
FIG. 2 is a top view of the present invention.
Figure 3:
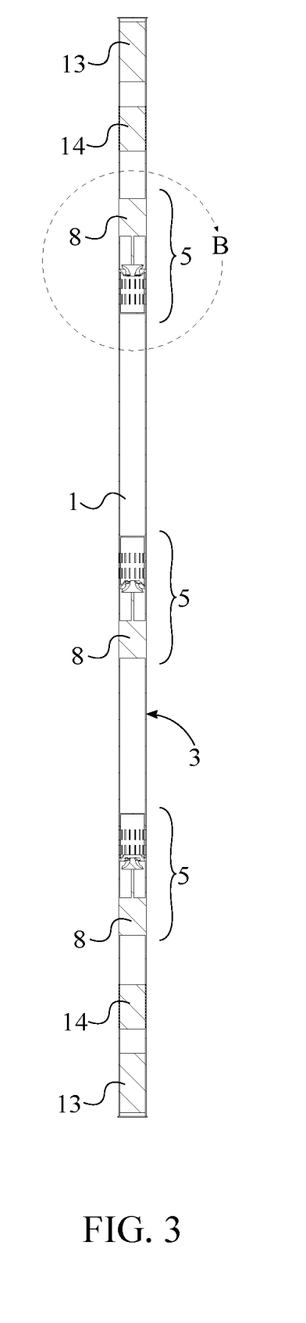
FIG. 3 is a sectional view of the present invention taken about line A-A in FIG. 2.

In yet another embodiment, the present invention further comprises an at least one solar panel 18. This embodiment is for implementing the present invention as a window curtain support. The solar panel 18 absorbs and converts the sun's rays into electrical energy. Said electrical energy is used to charge the rechargeable battery 13, thus increasing the operating time of the present invention and saving the user money in relation to the power bill. Referring to FIG. 2, the solar panel 18 is integrated into the external surface 3 of the tubular body 1 and is oriented outwards. Additionally, the solar panel 18 is electrically connected to the rechargeable battery 13 and is electronically connected to the microcontroller 16. The size, type, shape, and other similar characteristics of the solar panel 18 may differ in order to meet the specific needs and requirements of the user.

In another embodiment, the present invention includes a multitude of the aforementioned components in order to adequately cool off the area around the tubular body 1 as well as produce quality sound. In this embodiment, the at least one heating fan assembly 5 comprises a plurality of heating fan assemblies. In particular, the plurality of heating fan assemblies includes three assemblies. The plurality of heating fan assemblies is equally distributed about the length of the tubular body 1. Additionally, the at least one waterproof speaker 14 comprises a plurality of waterproof speakers 14. The plurality of waterproof speakers 14 is equally distributed about the length of the tubular body 1. In order to power the aforementioned components, the at least one rechargeable battery 13 includes a first battery and a second battery. The first battery and the second battery are mounted within either end of the tubular body 1 as seen in FIG. 1 through FIG. 4.

Although the invention has been explained in relation to its preferred embodiment, it is to be understood that many other possible modifications and variations can be made without departing from the spirit and scope of the invention as hereinafter claimed.

What is claimed is:

1. A heating curtain rod with integrated speakers comprises:
    a tubular body;
    at least one heating fan assembly;
    at least one rechargeable battery;
    the heating fan assembly comprises an impeller, an electric motor, a plurality of inlet slots, a plurality of outlet slots, and a heating element;
    the rechargeable battery, and the heating fan assembly being internally mounted within the tubular body;
    the impeller being oriented along a main axis of the tubular body;
    the electric motor being axially connected to the impeller, opposite an inlet side of the impeller;
    the plurality of inlet slots radially traversing through the tubular body, adjacent to the inlet side of the impeller;
    the heating element being positioned adjacent to the impeller;
    the plurality of outlet slots radially traversing through the tubular body;
    the plurality of inlet slots and the plurality of outlet slots being positioned opposite to each other, across the impeller;
    the plurality of inlet slots being in fluid communication with the plurality of outlet slots through the impeller;
    the rechargeable battery being electrically connected to the electric motor, and the heating element;
    at least one waterproof speaker;
    the waterproof speaker being integrated into an external surface of the tubular body.

2. The heating curtain rod with integrated speakers as claimed in claim 1 comprises:
    a wireless communication device;
    a microcontroller;
    the wireless communication device and the microcontroller being internally mounted within the tubular body;
    the rechargeable battery being electrically connected to the waterproof speaker, the wireless communication device, and the microcontroller; and
    the microcontroller being electronically connected to the waterproof speaker, the wireless communication device, the heating element, and the electric motor.

3. The heating curtain rod with integrated speakers as claimed in claim 1 comprises:
    a digital thermometer;
    a microcontroller;
    the microcontroller being internally mounted within the tubular body;
    the digital thermometer being externally mounted to the tubular body;
    the rechargeable battery being electrically connected to the digital thermometer and the microcontroller; and
    the microcontroller being electronically connected to the electric motor, the digital thermometer, and the heating element.

4. The heating curtain rod with integrated speakers as claimed in claim 1 comprises:
    the heating fan assembly further comprises an annular air diffuser;
    the annular air diffuser being internally mounted within the tubular body; and
    the annular air diffuser being concentrically positioned around the impeller.

5. The heating curtain rod with integrated speakers as claimed in claim 1 comprises:
    the rechargeable battery being removably mounted within the tubular body; and
    the rechargeable battery being terminally positioned along the tubular body.

6. The heating curtain rod with integrated speakers as claimed in claim 1 comprises:
    at least one solar panel;
    a microcontroller;
    the microcontroller being internally mounted within the tubular body;
    the solar panel being integrated into the external surface of the tubular body;
    the rechargeable battery being electrically connected to the solar panel and the microcontroller; and
    the microcontroller being electronically connected to the electric motor, the solar panel, and the heating element.

7. The heating curtain rod with integrated speakers as claimed in claim 1 comprises:
    the heating element being a silicone-rubber heater sleeve;
    the silicone-rubber heater sleeve being positioned adjacent to the plurality of inlet slots; and
    the silicone-rubber heater sleeve being internally connected to the tubular body.

8. A heating curtain rod with integrated speakers comprises:
    a tubular body;
    at least one heating fan assembly;
    at least one rechargeable battery;
    at least one waterproof speaker;

a wireless communication device;

a microcontroller;

the heating fan assembly comprises an impeller, an electric motor, a plurality of inlet slots, a plurality of outlet slots, and a heating element;

the rechargeable battery, the heating fan assembly, the wireless communication device, and the microcontroller being internally mounted within the tubular body;

the impeller being oriented along a main axis of the tubular body;

the electric motor being axially connected to the impeller, opposite an inlet side of the impeller;

the plurality of inlet slots radially traversing through the tubular body, adjacent to the inlet side of the impeller;

the heating element being positioned adjacent to the impeller;

the plurality of outlet slots radially traversing through the tubular body;

the plurality of inlet slots and the plurality of outlet slots being positioned opposite to each other, across the impeller;

the plurality of inlet slots being in fluid communication with the plurality of outlet slots through the impeller;

the waterproof speaker being integrated into an external surface of the tubular body;

the rechargeable battery being electrically connected to the waterproof speaker, the wireless communication device, the microcontroller, the electric motor, and the heating element; and the microcontroller being electronically connected to the waterproof speaker, the wireless communication device, the electric motor, and the heating element.

9. The heating curtain rod with integrated speakers as claimed in claim 8 comprises:

a digital thermometer;

the digital thermometer being externally mounted to the tubular body;

the rechargeable battery being electrically connected to the digital thermometer; and the microcontroller being electronically connected to the digital thermometer.

10. The heating curtain rod with integrated speakers as claimed in claim 8 comprises:

the heating fan assembly further comprises an annular air diffuser;

the annular air diffuser being internally mounted within the tubular body; and the annular air diffuser being concentrically positioned around the impeller.

11. The heating curtain rod with integrated speakers as claimed in claim 8 comprises:

the rechargeable battery being removably mounted within the tubular body; and the rechargeable battery being terminally positioned along the tubular body.

12. The heating curtain rod with integrated speakers as claimed in claim 8 comprises:

at least one solar panel;

the solar panel being integrated into the external surface of the tubular body;

the rechargeable battery being electrically connected to the solar panel; and the microcontroller being electronically connected to the solar panel.

13. The heating curtain rod with integrated speakers as claimed in claim 8 comprises:

the heating element being a silicone-rubber heater sleeve;

the silicone-rubber heater sleeve being positioned adjacent to the plurality of inlet slots; and the silicone-rubber heater sleeve being internally connected to the tubular body.

* * * * *